Patented Aug. 25, 1936

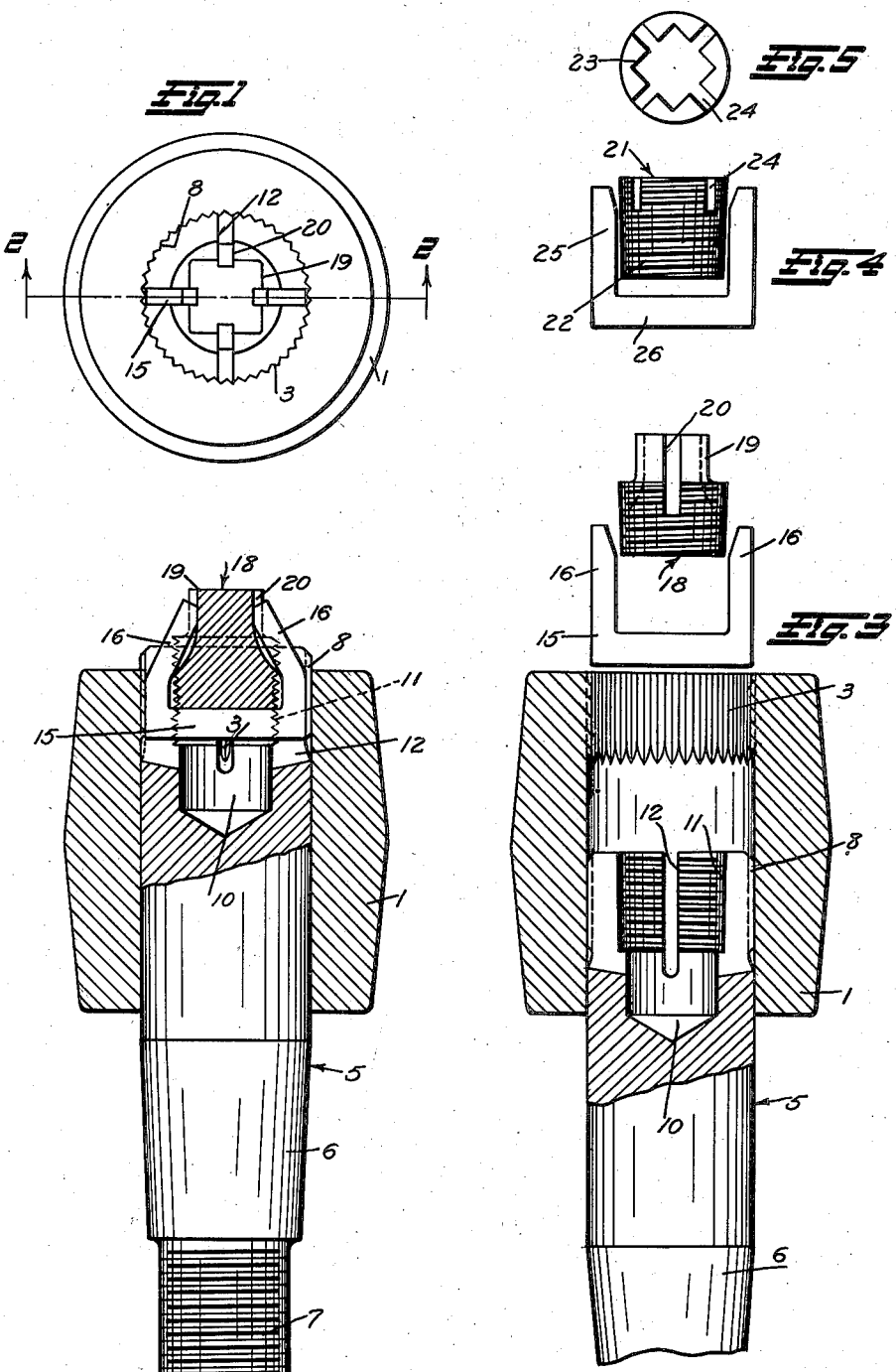

2,052,241

UNITED STATES PATENT OFFICE 2,052,241

LOCKING DEVICE

Mathew B. Morgan, Detroit, Mich., assignor to The Timken-Detroit Axle Company, Detroit, Mich., a corporation of Ohio Application March 26, 1934, Serial No. 717,485

13 Claims. (Cl. 287—53)

This invention relates to locking devices in general, and more particularly to such devices as involve an element having an aperture therein with an inner member fitted within the aperture, the inner member being expanded to obtain a shake-proof fit.

Conventional devices of this character usually comprise an inner member which has its outer surface formed with threads, splines, serrations or the like, to provide engaging means arranged to register with like means on the inner surface of an aperture or opening in an outer member. The sizes of the respective engaging portions are ordinarily such as to provide a free fit to facilitate assembly. The inner member is ordinarily slotted longitudinally at two or more places and has a central threaded bore assembly that may be either straight or tapered. In assembly, the inner member is placed in the aperture, with the respective engaging portions in registry, and a third taper-threaded member is screwed in the central threaded bore causing the adjacent portions of the inner member, defined by the longitudinal slots, to expand; and causing the engaging means on the outer surface thereof to jam tightly against the corresponding means on the inner surface of the aperture.

The above described old type of locking device is characterized by many disadvantages. For instance, due to the constant shaking and vibration, as when applied to assemblies in automotive vehicles, and due to the tendency of the sprung portions of the inner member to regain their natural positions, the expanding or jamming third member is apt to rotate outwardly or unscrew, thus relieving the expanding or jamming action and causing the fit previously obtained between the inner and outer members to be released with a consequent failure of the assembly.

In overcoming these disadvantages, the present invention has among its principal objects the provision of novel locking means for the expansion members of such assemblies whereby the expansion members may be positively locked in any desired position.

A further object of this invention is the provision of a novel locking means for an assembly of the type described wherein only a single stamping step is required in its manufacture, and no additional machining is required on either the inner or outer members of the assembly.

Still a further object of this invention is the provision of novel locking means for the expansion member of a locking assembly wherein the expansion member serves to retain its locking means within the assembly.

A further object of this invention is the provision of novel locking means for the expansion member of a locking assembly wherein the locking means is substantially entirely contained and protected within the assembly and no projecting portions that may be bent or broken are involved.

Still a further object of this invention is the provision of locking means in novel combination with a joint or assembly specially adapted for torque transmission.

The accomplishment of the above and other objects will appear from the following description and drawing in which:

Figure 1 is a plan view of the device embodying a preferred form of my invention;

Figure 2 is a side elevational view partially in section along the line 2—2 of Figure 1;

Figure 3 is an exploded view of the assembly view of Figure 2, showing the parts of the locking device of this invention in their relative positions prior to assembly;

Figure 4 is a side elevational view of a further preferred form of my invention; and Figure 5 is a plan view of the form of Figure 4.

Referring now to the drawing wherein like numerals refer to like parts wherever they occur, and particularly to Figure 3, the numeral 1 indicates the outer member, which, it is to be understood, may be of any desired design or adaptable for any particular article or use. For the purpose of this disclosure, a cylindrical sleeve or tubing has been shown, which has at one end an internal serrated portion 3, the inner diameter of which is less than the inner diameter of the remaining portions of the sleeve. An inner member 5, for the purposes of illustration, is shown as a pin having a tapered portion 6 and a threaded portion 7 at one end thereof, and at the opposite end a serrated portion 8 designed to register with serrations 3 of outer member 1, an internal blind hole or bore 10 which is threaded at its upper portion as at 11, and a plurality of slots 12 interrupting bore 10 and preferably running longitudinally for a distance slightly greater than the depth of threaded portion 11, slots 12 radially connecting the threaded portion and the serrated portion of the pin.

Slots 12 are preferably arranged so that they form pairs in diametrical alignment. It is to be understood that the number of slots may vary, depending upon the size of the inner member and the resistance to springing desired. A locking member 15, which is preferably substantially U- shaped and of a thickness slightly less than the width of one of slots 12, is designed to be inserted into two diametrically opposed slots. The dimensions from outside to outside of the legs 16 of the U-section is slightly less than the inside diameter of the serrated portion 3, and the dimension from inside to inside of legs 16 is slightly greater than the diameter of the threaded portion 11 of bore 10. Expanding member 18 is preferably formed as a pipe plug having a tapered threaded portion adjacent a head 19 which may be of any desired shape and which is for the purpose of turning the plug, as by a wrench or other tool. In the form shown, it has the shape of a square. The head portion 19 has, as shown, four longitudinal grooves 20 extending from the uppermost part of head 19 to a point approximately halfway down the threaded portion. The number of grooves 20 depends primarily upon the design of head 19. For instance, if head 19 is of hexagonal shape, it would be preferable to have six grooves 20. Preferably, the lengths of legs 16 of member 15 is equal to, or slightly less than, the overall height of the expanding member 18.

In assembly, inner member 5 is inserted in the outer member 1 and may be manually held in correct relation while lock 15 is dropped into a pair of slots 12 and expanding member 18 is threaded into threaded portion 11 of inner member 5. The member 18 is threaded into threaded portion 11 until the desired tightness of fit between inner member 5 and outer member 1 is secured, at which time legs 16 of lock 15 may be bent into grooves 20. It will be noted that, at their upper extremities, legs 16 are formed with a tapered portion which obviously may be curved, if desired, to facilitate the fitting of the ends of legs 16 into grooves 20 in plug 18. If the grooves 20 are not in alignment with legs 16, expanding member 18 may be turned until alignment is effected. In this manner, expanding member 18 is prevented from rotating after once having been assembled. It is further to be noted that it is not necessary for plug 18 to be threaded into pin 5 to any specified degree since a lock may be obtained with the threaded portion only partly inside of the pin or entirely inside of the pin. It is further to be noted that a locking member 15 may be used with only one leg 16 that would engage one of slots 12 and one of slots 20 in locking position.

It is further to be observed that the locking member 15 is contained almost entirely within the assembly, and, in preventing expanding member 18 from backing out, its maintenance in proper position is also assured.

In installations wherein expanding member 18 is of sufficient size, a further preferred form of the locking device of the present invention may be employed as shown in Figures 4 and 5. Since all portions of the assembly aside from the expanding member and its locking member are substantially identical with the elements of Figures 1 to 3 inclusive, description thereof is omitted.

In the modification of Figures 4 and 5, a tapered expanding member 21 of headless construction is employed, the member being preferably threaded throughout its length as shown at 22. An opening 23 of any desired configuration as for instance square or hexagonal to accommodate a tool for turning the member is provided in the head thereof. Obviously, if desired opening 23 may extend entirely through member 21 or only part way therethrough. Radially disposed slots 24 are formed in the outer end of member 21 for accommodation of the leg or legs 25 by a locking member 26, closely resembling locking member 15. Any number of slots 24 may be employed and it is not necessary that they lie in exact radial position since they may be formed in any direction in which the ends of legs 25 may be bent thereunto. Legs 25 are preferably only slightly greater in the length than member 21 and are of a width slightly less than the depth of slots 24 in order that they may be accommodated therein with no protuberant portions.

In assembling the device of Figures 4 and 5, locking member 26 is placed in slots 12 as of a member 5 (Figure 3) and expanding member 21 threaded into opening 10. When member 5 has been sufficiently expanded to produce the desired connection, the protruding ends of leg or legs 25 of member 26 are bent over into adjacent slots 24 and the member 21 securely locked in position. It will be noted that this modification is particularly advantageous in that it is substantially self-contained and there are no protruding elements.

The specific assembly herein disclosed involving a splined or like connection with locking means therefor is particularly advantageous in torque transmission where a threaded or like joint would tend to either loosen or jam, depending upon the direction of the applied torque.

In summation the advantages of the locking device of the present invention are, among others, (1) its extreme positiveness, (2) its simplicity with consequent low production costs, (3) its failure to add bulk to the assembly, (4) in locking the member which it is designed to lock, it also locks itself, (5) there is no possibility of its becoming loose or broken during usage, and (6) there is no definite longitudinal position required of the member to be locked.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a locking device for an element positioned in an aperture in a second element, said first element having a bore therein; means with a slot therein arranged to engage said bore to expand and lock said first element in said aperture; and locking means having a portion positioned in said aperture and said slot to lock said expanding means in any desired position.

2. In a locking device for an element positioned in an aperture in a second element, said first element having a bore therein interrupted by a slot; a plug with a slot therein arranged to engage said bore to expand and lock said first element in said aperture; and locking means having a portion positioned in said aperture and arranged to connect said slots to lock said plug in position.

3. In a locking device, a member having an aperture therein; a pin fitted in said aperture having a threaded bore therein interrupted by a longitudinal slot; a tapered plug with a longitudinal slot therein arranged to be threaded into said bore to expand and lock said pin in said aperture; and a locking member arranged to be locked in said bore and engage the slots in said pin and said plug to lock the latter member in position.

4. In a locking device, a member having an aperture therein; a pin in said aperture having a threaded bore interrupted by a slot; a tapered plug with a slot therein arranged to be threaded into said bore to expand and lock said pin in said aperture; a locking member arranged to engage the slots in said pin and said plug to lock said plug against rotation; and means associated with said locking member and engaged by said plug to retain said locking member in position.

5. In a locking device, a member having an aperture therein; a pin fitted in said aperture having a threaded bore therein interrupted by a slot; an expanding member having a slot therein arranged to be threaded into said bore to expand and lock said pin in said aperture; and a locking member held in position by said expanding member and arranged to connect the slots in said pin and expanding member to lock the latter member in position.

6. In a locking device, a member having an aperture therein; a pin in said aperture having a threaded bore therein interrupted by longitudinal slots; a tapered plug having longitudinal slots in the surface thereof and arranged to be threaded into said bore to expand and lock said pin in said aperture; a U-shaped locking member disposed in said threaded bore to connect the slots in said pin and said plug to lock the latter member in position, the inner end of said plug being disposed adjacent the center leg of said U-shaped locking member to retain the latter in position.

7. In a locking device, a member having an aperture therein; a pin in said aperture having a threaded bore therein interrupted by longitudinal slots; a tapered plug arranged to be threaded into said bore to expand and lock said pin in said aperture, said plug having a threaded portion and a tool engaging portion, the latter having longitudinal slots in the surface thereof; and a U-shaped locking member disposed in the slots of said threaded bore with the central leg thereof adjacent the inner end of said tapered plug, the legs of said U-shaped member being arranged to engage the slots of said tapered plug to lock the latter in any desired position.

8. In a locking device, a member having an aperture therein; a pin fitted in said aperture having a threaded bore interrupted by longitudinal slots; a tapered plug having longitudinal slots in a portion of the surface thereof and arranged to be threaded into said bore to expand and lock said pin in said aperture; and a U-shaped locking member disposed in the slots of said threaded bore with the central leg thereof adjacent the inner end of said tapered plug, said locking member being formed of a material to permit the legs thereof to be bent into the slots of said tapered plug to lock the latter in any desired position.

9. In a locking device, a member having an aperture therein; a pin fitted in said aperture having a threaded bore therein interrupted by a longitudinal slot; a tapered plug therein with a slot in an end thereof arranged to be threaded into said bore to expand and lock said pin in said aperture; and a locking member arranged to be locked in said bore and engage the slots in said pin and said plug to lock the latter in position.

10. In a torque transmitting connection, a freely fitting joint comprising a member splined within an aperture in a second member, said first member having a threaded bore therein interrupted by a longitudinal slot; a headless tapered plug with a slot in the end thereof arranged to be threaded into said bore to expand and lock said first member in said aperture; and a locking member arranged to engage said slots to lock the latter member in position, the portion of the locking member engaging the latter member being arranged to lie wholly within the slot therein.

11. A locking means for a screw threaded into a bore having a slot therein comprising a member positioned in said slot, means on said member engaged by the inner end of said screw to retain said member in position, said member being shaped to engage the outer end of said screw to prevent rotation thereof.

12. A locking means for a tapered screw threaded into a member having a bore therein with a slot in said bore to permit the expansion of said member, said tapered screw having a recess in the outer end thereof, comprising means positioned in said slot and engaged by the inner end of said screw, said means being arranged to engage the recess in the outer end of said screw to prevent rotation thereof.

13. A locking means for a screw threaded into a member having a bore therein with slots in said bore to permit the expansion of said member, said screw having a plurality of recesses in the outer end thereof, comprising means positioned in said slots and engaged by the inner end of said screw to prevent longitudinal movement thereof, said means being shaped to engage the plurality of recesses in the outer end of said screw to prevent rotation thereof.

MATHEW B. MORGAN.